Jan. 20, 1953  G. G. MacKINNON  2,626,085
ELECTRIC HAND GREASE GUN
Filed Dec. 30, 1949  2 SHEETS—SHEET 1
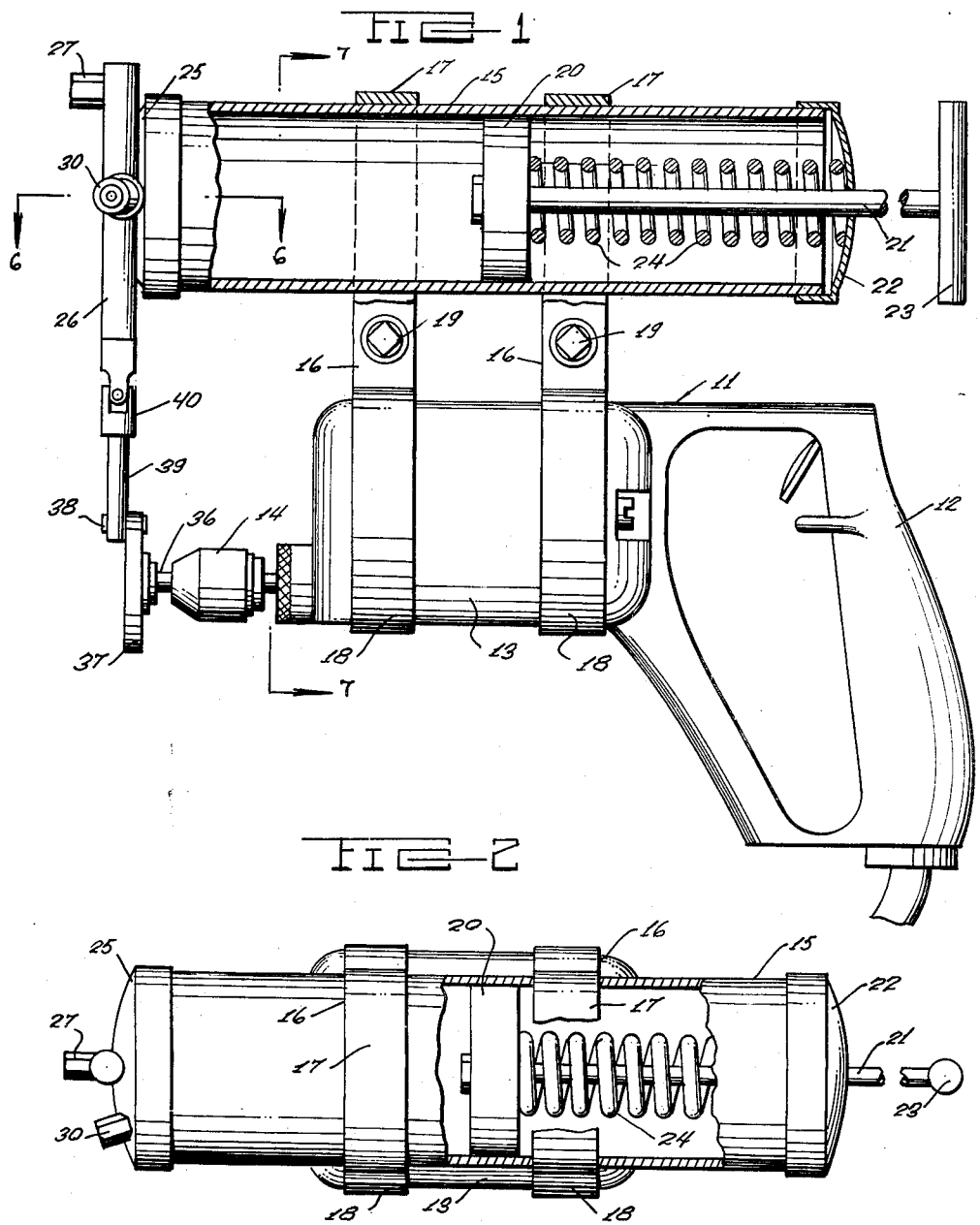

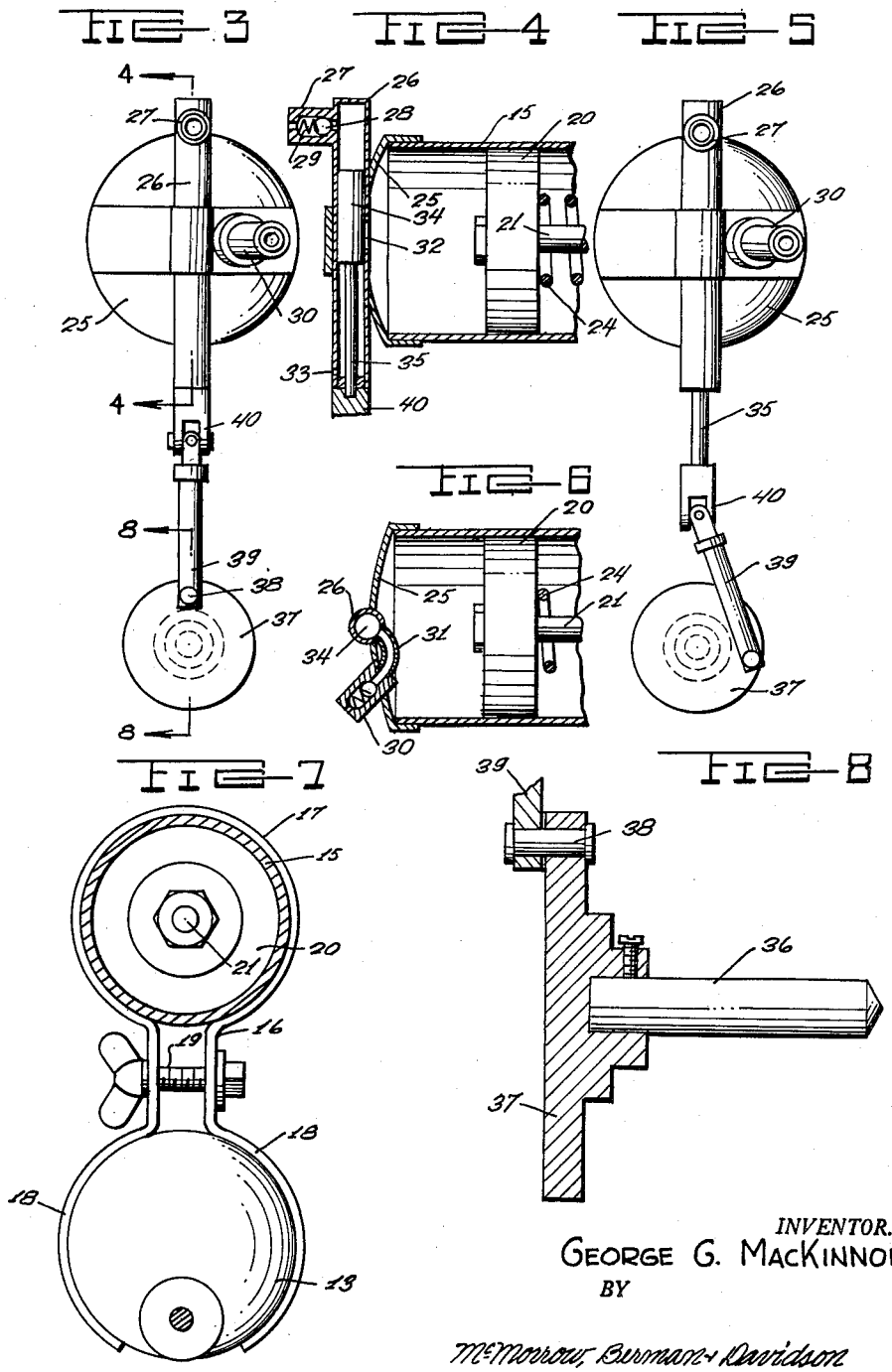

Patented Jan. 20, 1953

2,626,085

UNITED STATES PATENT OFFICE 2,626,085

ELECTRIC HAND GREASE GUN

George G. MacKinnon, Guilford, Maine

Application December 30, 1949, Serial No. 136,065

2 Claims. (Cl. 222—262)

This invention relates to grease guns for use in applying grease to machine parts and the like, and more particularly to a power-driven grease gun.

A main object of the invention is to provide a novel and improved power-driven grease gun which is simple in construction, easy to operate, easy to refill, and which is reliable in performance.

A further object of the invention is to provide an improved electrically-driven grease gun which involves very simple parts, which is rugged in construction, which is light in weight, which is compact in size, and which requires very little attention to maintain in operating condition.

Further objects and advantages of the invention will become apparent from the following description and claims, and from the accompanying drawings, wherein:

Figure 1 is a side elevational view, partly in longitudinal cross-section, of a power-driven grease gun constructed in accordance with the present invention;

Figure 2 is a top plan view, partly in cross-section, of the grease gun of Figure 1;

Figure 3 is a front end elevational view of the grease gun of Figure 1;

Figure 4 is a fragmentary cross-sectional view taken on line 4—4 of Figure 3;

Figure 5 is a front end elevational view similar to Figure 3, but showing the crank disc of the grease gun in a position rotated 90° from the position of Figure 3;

Figure 6 is a fragmentary cross-sectional view taken on line 6—6 of Figure 1;

Figure 7 is a vertical cross-sectional view taken on line 7—7 of Figure 1;

Figure 8 is an enlarged cross-sectional detail view taken on line 8—8 of Figure 3.

Referring to the drawings, 11 designates a conventional electric hand drill provided with a hand grip 12, the motor body 13, and the chuck member 14. Designated at 15 is a grease cylinder which is secured in parallel relation to the motor body 13 of the drill 11 by a pair of clamp members 16, 16 having substantially circular top portions 17 embracing the cylinder 15 and having arcuate lower portions 18 clampingly engaging the motor body 13. The intermediate portions of the clamp members 16 are secured by clamping bolts shown at 19.

Slidably positioned in cylinder 15 is the usual piston 20 provided with a piston rod 21 which extends axially through the rear end wall of the piston, shown at 22, and is provided with a handle 23. A coil spring 24 encircles piston rod 21 and bears between end wall 22 and piston 20, biasing the piston forwardly. Rod 21 is freely slidable in end wall 22.

The front wall element of the cylinder 15 is designated at 25. Secured to front wall 25 in diametrical relation therewith is a cylinder 26 provided at its top end with a grease outlet nozzle 27. Outlet nozzle 27 is provided with the usual ball check valve element 28 which is biased inwardly toward seating position by a spring 29. Front wall 25 carries an additional grease outlet nozzle 30 connected to the intermediate portion of cylinder 26 by a conduit 31, said nozzle 30 being also provided with a ball check valve. As shown in Figure 4, the intermediate portion of cylinder 26 communicates with the forward space in cylinder 15 by a passage 32 formed at the junction of cylinder 26 with end wall 25. At its lower end portion cylinder 26 is formed with an air vent 33. Slidably positioned in cylinder 26 is a plunger 34 having a plunger rod 35 extending slidably through the bottom end wall of cylinder 26. Secured in chuck 14 is a spindle 36, and secured on the end of spindle 36 is a disc 37. Pivotally connected to the peripheral portion of disc 37 by rivet 38 is a crank rod 39 whose top end is connected by universal joint 40 to the lower end of plunger rod 35.

In operation, the forward space in cylinder 15 is filled with grease, the grease being forced toward passage 32 by the spring pressure exerted on piston 20 by spring 24. Rotation of disc 37 by the electric driving member 11 causes vertical reciprocation of plunger rod 35 and, therefore, causes plunger 34 to reciprocate vertically in cylinder 26. On each downward stroke of plunger 34 suction is produced in the upper portion of cylinder 26, allowing grease to enter said upper portion from cylinder 15 through the passage 32, and on the upward stroke of plunger 34 the grease is placed under high compression. When engaging either the nozzle 27 or the nozzle 30 with a grease fitting, the ball valve in the nozzle may be pushed back to allow grease to be forced into the fitting.

The rear end wall is detachable as in conventional grease guns of the hand-operated type, so that the supply of grease may be readily replenished by removing the rear end wall and piston by means of the piston rod 21 and handle 23.

While a specific embodiment of a power-driven grease gun has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A grease gun attachment for use on an electric drill of the type including a drive motor, a longitudinally extending driven chuck extending from one end of said motor and operatively connected thereto, and a handle projecting from the other end of said motor, said attachment comprising a grease cylinder adapted to be arranged in spaced parallel relation with respect to said motor, clamp means arranged to operatively connect said drive motor to said cylinder for rigidly supporting the latter parallel to said motor, a discharge cylinder disposed transversely of and exteriorly of said grease cylinder contiguous to the end of the latter adjacent said driven chuck and rigidly secured to said grease cylinder in communication therewith, a discharge nozzle positioned contiguous to one end of said discharge cylinder and connected thereto in communication therewith, a piston positioned within said grease cylinder and mounted therein for movement toward and away from said one end thereof, resilient means operatively connected to said piston for biasing the latter toward said one end of said grease cylinder for urging the grease within the latter toward said discharge cylinder, a plunger positioned within said discharge cylinder and mounted therein for longitudinal reciprocatory movement toward and away from said discharge nozzle, means arranged to detachably connect said plunger to said driven chuck and arranged to reciprocate the former in response to the rotary movement of the latter, and air inlet means formed in said discharge cylinder whereby, upon movement of said plunger away from said discharge nozzle grease is drawn into said discharge cylinder, and upon movement of said plunger toward said discharge nozzle, grease is forced out of the latter.

2. A grease gun attachment for use on an electric drill of the type including a drive motor, a longitudinally extending driven chuck extending from one end of said motor and operatively connected thereto, and a handle projecting from the other end of said motor, said attachment comprising a grease cylinder adapted to be arranged in spaced parallel relation with respect to said motor, detachable clamp means arranged to operatively connect said drive motor to said cylinder for rigidly supporting the latter parallel to said motor, a discharge cylinder disposed transversely of and exteriorly of said grease cylinder contiguous to the end of the latter adjacent said driven chuck and rigidly secured to said grease cylinder in communication therewith, a discharge nozzle positioned contiguous to one end of said discharge cylinder and connected thereto in communication therewith, a piston positioned within said grease cylinder and mounted therein for movement toward and away from said one end thereof, resilient means operatively connected to said piston for biasing the latter toward said one end of said grease cylinder for urging the grease within the latter toward said discharge cylinder, a plunger positioned within said discharge cylinder and mounted therein for longitudinal reciprocatory movement toward and away from said discharge nozzle, means arranged to detachably connect said plunger to said driven chuck for reciprocating the former in response to the rotary movement of the latter, and air inlet means formed in the discharge cylinder whereby, upon movement of said plunger away from said discharge nozzle, grease is drawn into said discharge cylinder, and upon movement of said plunger toward said discharge nozzle grease is forced out of the latter, the means connecting said plunger and said driven chuck including a plunger rod carried by said plunger, a disc arranged to be disposed transversely of said driven chuck and to be detachably secured thereto, and a crank pivotally connected to the peripheral portion of said disc and universally connected to said plunger rod.

GEORGE G. MacKINNON.

REFERENCES CITED

The following references are of record in the file of this patent:

UNITED STATES PATENTS

| Number | Name | Date |
|---|---|---|
| 1,905,878 | Albertine | Apr. 25, 1933 |
| 1,972,181 | Chambers | Sept. 4, 1934 |